United States Patent
Tateishi

(10) Patent No.: US 10,681,959 B2
(45) Date of Patent: Jun. 16, 2020

(54) SHOCK ABSORBING MATERIAL, SHOE SOLE MEMBER, SHOE, AND PROTECTIVE EQUIPMENT FOR SPORTS

(71) Applicant: ASICS Corporation, Kobe-shi (JP)

(72) Inventor: Junichiro Tateishi, Kobe (JP)

(73) Assignee: ASICS CORPORATION (JP)

( * ) Notice: Subject to any disclaimer, the term of this patent is extended or adjusted under 35 U.S.C. 154(b) by 190 days.

(21) Appl. No.: 16/066,661

(22) PCT Filed: Dec. 28, 2015

(86) PCT No.: PCT/JP2015/086507
§ 371 (c)(1),
(2) Date: Jun. 27, 2018

(87) PCT Pub. No.: WO2017/115416
PCT Pub. Date: Jul. 6, 2017

(65) Prior Publication Data
US 2019/0021443 A1    Jan. 24, 2019

(51) Int. Cl.
| | | |
|---|---|---|
| *A43B 13/18* | (2006.01) | |
| *A43B 13/04* | (2006.01) | |
| *A43B 13/02* | (2006.01) | |
| *C08J 9/00* | (2006.01) | |
| *F16F 15/04* | (2006.01) | |
| *A43B 13/12* | (2006.01) | |

(52) U.S. Cl.
CPC .......... *A43B 13/187* (2013.01); *A43B 13/02* (2013.01); *A43B 13/023* (2013.01); *A43B 13/04* (2013.01); *A43B 13/12* (2013.01); *A43B 13/18* (2013.01); *C08J 9/00* (2013.01); *C08J 9/0061* (2013.01); *F16F 15/04* (2013.01); *C08J 2300/22* (2013.01); *C08J 2300/26* (2013.01)

(58) Field of Classification Search
CPC ....... A43B 13/02; A43B 13/023; A43B 13/04; A43B 13/12; A43B 13/18; A43B 13/187; A43B 13/125; C08J 2300/22; C08J 2300/26; C08J 2201/026; C08J 2207/00; C08J 2400/22; C08J 2400/26; C08J 9/00; C08J 9/10; C08J 9/0061; C08J 2323/06; C08J 2323/08; F16F 15/04; C08L 2203/14; C08L 23/0815; C08L 53/025
See application file for complete search history.

(56) References Cited

U.S. PATENT DOCUMENTS

| | | |
|---|---|---|
| 6,864,315 B1 | 3/2005 | Hakuta et al. |
| 7,208,548 B2 | 4/2007 | Hakuta et al. |
| 8,329,825 B2 | 12/2012 | Mori et al. |
| 9,723,893 B2 | 8/2017 | Tateishi |
| 2005/0154132 A1 | 7/2005 | Hakuta et al. |
| 2006/0235094 A1 | 10/2006 | Habibi-Naini |
| 2009/0162633 A1 | 6/2009 | Mori et al. |
| 2010/0068452 A1 | 3/2010 | Kusanose et al. |
| 2015/0290877 A1 | 10/2015 | Darland |
| 2017/0215522 A1 | 8/2017 | Tateishi et al. |

FOREIGN PATENT DOCUMENTS

| | | |
|---|---|---|
| CN | 1296510 A | 5/2001 |
| CN | 1853896 A | 11/2006 |
| CN | 101326235 A | 12/2008 |
| JP | H03213515 A | 9/1991 |
| JP | H11-206406 A | 8/1999 |
| JP | 2004-323757 A | 11/2004 |
| JP | 2012-052106 A | 3/2012 |
| JP | 57-19980 B | 3/2015 |
| JP | 5690983 B1 | 3/2015 |
| WO | 2014/192910 A | 12/2014 |

OTHER PUBLICATIONS

Extended European Search Report dated Nov. 6, 2019, from the corresponding European Application No. 15912082.3.
International Search Report for International Application No. PCT/JP2015/086507.
International Chapter II Preliminary Report on Patentability for International Application No. PCT/JP2015/086507.
Reason for Refusal for Japanese Patent Application No. 2017-558817 dated Jun. 29, 2018.
Office Action for Chinese Patent Application No. 201580085611.3 dated May 7, 2019.
Brydson J.A., "Plastics Materials", Seventh Edition, Published 1999, Butterworth-Heinemann, UK, Section 18.15—Elastomeric Polyamides, pp. 526-528.
Arkema Innovative Chemistry, "Pebax® Powered: pushing the boundaries of sports equipment and athletes!" Published Sep. 29, 2015. Retrieved from the Internet on Dec. 10, 2018: <URL: https://www.arkema.com/export/shared/.content/media/downloads/news-attachments/global/en/press-release/2015/20150929-Pebax-powered.pdf>.
Examination Report No. 1 for Australian Patent Application No. 2015418967 dated Sep. 14, 2018.

*Primary Examiner* — Christopher M Rodd
(74) *Attorney, Agent, or Firm* — Katten Muchin Rosenman LLP

(57) ABSTRACT

Provided is a shock absorbing material partially or fully formed from a crosslinked foam, wherein the crosslinked foam shows specific measurement results by pulsed NMR.

9 Claims, 2 Drawing Sheets

SHOCK ABSORBING MATERIAL, SHOE SOLE MEMBER, SHOE, AND PROTECTIVE EQUIPMENT FOR SPORTS

FIELD

The present invention relates to a shock absorbing material, a shoe sole member, a shoe, and protective equipment for sports. More specifically, the shoe sole member and the shoe relate, for example, to a shoe sole member used as an inner sole, a sock liner, a midsole, an outer sole, or the like, and a shoe including such a shoe sole member. More specifically, the protective equipment for sports relates, for example, to protective equipment for sports used as a glove, a protector, an exercise mat, or the like.

BACKGROUND

A sports shoe used for various competitions or the like is composed of a lot of members and is composed of shoe sole members such as an inner sole, a sock liner, a midsole, and an outer sole, for example, in the case of a shoe sole.

Conventional shoe sole members are formed using crosslinked foams of ethylene-vinyl acetate copolymers (EVA) and/or polyethylenes blended with rubbers or ethylene-butene copolymers (EBM), and in particular, crosslinked foams of ethylene-vinyl acetate copolymers have been widely used (see Patent Literature 1 below).

CITATION LIST

Patent Literature

Patent Literature 1: JP H11-206406 A

SUMMARY

Technical Problem

In order to allow shoes to exhibit comfort, it is desirable that shoe sole members be excellent in impact resistance. Further, shoe sole members may be required to have a small thickness in some cases, depending on the application of shoes. In order to satisfy the impact resistance while reducing the thickness, it is conceivable to reduce the expansion ratio (reduce the specific gravity), but there is a problem that the weight of shoe sole members is increased in the case of reducing the expansion ratio.

Further, although it is also conceivable to enhance the hardness of shoe sole members in order to satisfy the impact resistance while reducing the thickness, there is a problem of causing uncomfortable wearing feeling, when the hardness is excessively enhanced. Accordingly, a crosslinked foam that is excellent in comfort even with a reduced thickness is desirable.

Further, not only shoe sole members but also shock absorbing materials used for protective equipment for sports or the like can possibly be required to have excellent shock absorbing properties even with a reduced thickness.

In view of such a demand, it is therefore an object of the present invention to provide a shock absorbing material having excellent shock absorbing properties even with a reduced thickness, so as to provide a shoe sole member having such a shock absorbing material, and protective equipment for sports having such a shock absorbing material, and further to provide a comfortable shoe even when the thickness of shoe sole members is reduced.

Solution to Problem

As a result of diligent studies, the present inventor has found that the aforementioned problem can be solved by using a crosslinked foam in which, relating to the content ratio of a phase (S phase) in which a short spin-spin relaxation time is observed in the measurement by pulsed NMR like crystalline phase or the like, a value obtained by subtracting the content ratio of S phase determined by pulsed NMR measurement at 40° C. from the content ratio of S phase determined by pulsed NMR measurement at 20° C. is large.

That is, a shock absorbing material according to the present invention is a shock absorbing material partially or fully formed from a crosslinked foam formed by crosslinking and foaming a polymer composition, wherein the crosslinked foam has a value obtained by subtracting the content ratio of S phase determined by pulsed NMR measurement at 40° C. from the content ratio of S phase determined by pulsed NMR measurement at 20° C. being 0.10 or more.

In the present invention, it is preferable that the crosslinked foam have a value obtained by subtracting the content ratio of S phase determined by pulsed NMR measurement at 40° C. from the content ratio of S phase determined by pulsed NMR measurement at 20° C. being higher than 0.15.

Further, in the present invention, it is preferable that the polymer composition contain a styrene thermoplastic elastomer.

Further, in the present invention, it is preferable that the polymer composition contain an amide thermoplastic elastomer.

Further, in the present invention, it is preferable that the maximum value of negative acceleration applied to a 10-kg weight when it is allowed to fall freely from a position 50 mm above the crosslinked foam at 23° C. so as to collide with the crosslinked foam be 20 G or less at a thickness of 10 mm.

Further, a shoe sole member according to the present invention includes the aforementioned shock absorbing material.

Further, a shoe according to the present invention includes the aforementioned shoe sole member.

Further, protective equipment for sports according to the present invention includes the aforementioned shock absorbing material.

Advantageous Effects of Invention

The present invention aims to provide a shock absorbing material having excellent shock absorbing properties even with a reduced thickness, further to provide a shoe sole member having such a shock absorbing material and protective equipment for sports having such a shock absorbing material, and further can provide a comfortable shoe even when the thickness of shoe sole members is reduced.

DESCRIPTION OF EMBODIMENTS

Figure 1:
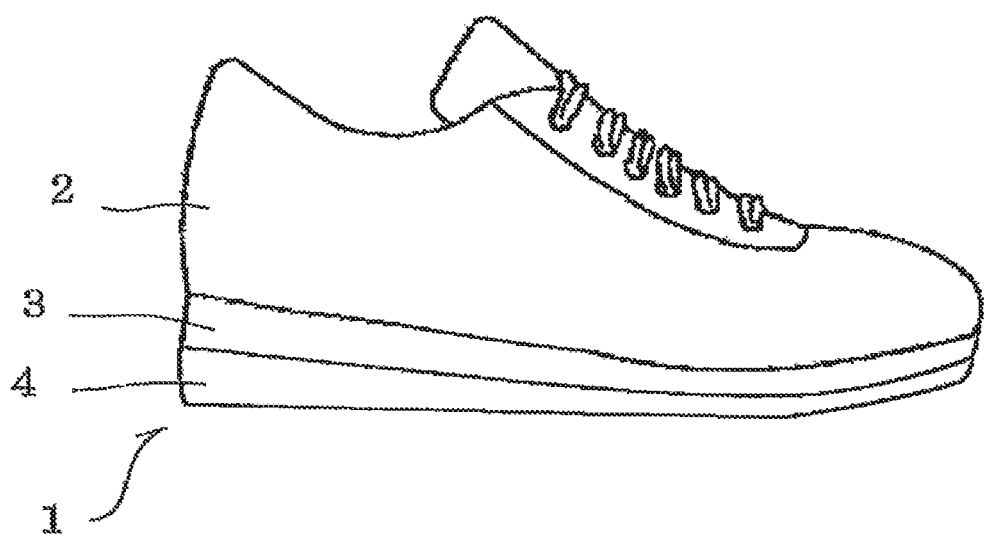
FIG. 1 is a schematic side view showing an aspect of a shoe including shoe sole members.

A shock absorbing material according to the present invention will be described by taking, for example, shock absorbing materials used for shoe sole members. FIG. 1 shows a shoe formed using shoe sole members of this embodiment. The shoe 1 has an upper material 2 and shoe sole members 3 and 4. The shoe 1 has a midsole 3 and an outer sole 4 as shoe sole members.

The shock absorbing materials of this embodiment are partially or fully formed from a crosslinked foam formed by crosslinking and foaming a polymer composition. Further, the crosslinked foam of this embodiment has a value obtained by subtracting the content ratio of S phase determined by pulsed NMR measurement at 40° C. ($F_{S40}$) from the content ratio of S phase determined by pulsed NMR measurement at 20° C. ($F_{S20}$) being 0.10 or more. In other words, the crosslinked foam of this embodiment satisfies the following relational expression.

$$F_{S20} - F_{S40} \geq 0.10 \qquad (1)$$

Further, it is preferable that the crosslinked foam of this embodiment have a value obtained by subtracting the content ratio of S phase determined by pulsed NMR measurement at 40° C. ($F_{S40}$) from the content ratio of S phase determined by pulsed NMR measurement at 20° C. ($F_{S20}$) being larger than 0.15. In other words, it is preferable that the crosslinked foam of this embodiment satisfy the following relational expression.

$$F_{S20} - F_{S40} > 0.15 \qquad (2)$$

The shoe sole members of this embodiment preferably have $F_{S20}$ of 0.15 to 0.80. Further, the shoe sole members of this embodiment preferably have $F_{S40}$ of 0.05 to 0.60.

In the pulsed NMR measurement, phases are classified into a phase (S phase) in which the spin-spin relaxation time is less than 0.02 ms, a phase (M phase) in which the spin-spin relaxation time is 0.02 ms or more and less than 0.1 ms, and a phase (L phase) in which the spin-spin relaxation time is 0.1 ms or more, to determine the content ratio of each phase. The spin-spin relaxation time can be determined, for example, by measurement using the solid-echo method and a pulsed NMR measuring device, model name "minispec mq20", manufactured by Bruker Optics K.K.

In the pulsed NMR, when elapsed time after the pulsed magnetic field is applied is referred to as t (ms), the magnetization with t=0 is referred to as MO, and the magnetization at the time t is referred to as M (t), the spin-spin relaxation time ($T_2$) is determined based on the following formula. In the following formula, "W" represents the weibull modulus.

$$M(t) = M_0 \exp\left(-\frac{t}{T_2}\right)^W \qquad [\text{Equation 1}]$$

Supposing that, when the measurement target is decomposed into n components, the magnetization of the i th (i<n) component with t=0 is $M_{0i}$, and the weibull modulus of the i component is $W_i$, the spin-spin relaxation time of the i component ($T_{2i}$) and the ratio Fi of the i component are determined based on the following formula. For example, $W_S=2$, $W_M=1$, and $W_L=1$ can be used as the weibull modulus $W_i$. Such a method for determining the relaxation time is disclosed, for example, in S. Yamasaki et al Polymer 48 4793 (2007).

$$M(t) = \sum_i^n M_{0i} \exp\left(-\frac{t}{T_{2i}}\right)^{W_i} \qquad [\text{Equation 2}]$$

$$F_i = \frac{M_{0i}}{\sum_i^n M_{0i}} \qquad [\text{Equation 3}]$$

In the case of a general polymer, the spin-spin relaxation time ($T_{2S}$, $T_{2M}$, and $T_{2L}$) and the content ratio ($F_S$, $F_M$, and $F_L$) of each phase do not significantly vary before and after crosslinking. Therefore, a crosslinked foam satisfying the relations shown in the aforementioned inequalities can be obtained with high probability by performing the pulsed NMR measurement in uncrosslinked state to investigate a polymer that satisfies the relations shown in the aforementioned inequalities and employing the polymer as a polymer of the polymer composition for forming the crosslinked foam.

Further, in the case of a general polymer, the spin-spin relaxation time and the content ratio of each phase are not significantly different depending on whether or not they are foamed. Therefore, in the case where it is necessary to predict more reliably whether or not a crosslinked foam satisfying the relations shown in the aforementioned inequalities is obtained, the prediction may be made by fabricating a non-foamed crosslinked sample using the polymer and subjecting the sample to the pulsed NMR measurement.

For the content ratios of S phase, M phase, and L phase, for example, in the case of a crystalline polymer, the crystalline phase is mainly observed as S phase in the pulsed NMR measurement, and the amorphous phase is mainly observed as M phase or L phase. Further, in the case of a block copolymer having a hard segment and a soft segment, the hard segment is mainly observed as S phase in the pulsed NMR measurement, and the soft segment is mainly observed as M phase or L phase.

Accordingly, it is possible to know the tendencies of the relaxation time and the content ratio depending on the degree of crystallinity, for example, by measuring several types of polyethylenes having different densities (different degrees of crystallinity) by pulsed NMR and collecting data on the spin-spin relaxation time and the content ratio of each phase. That is, in the case of using a polyethylene as the polymer of the crosslinked foam, it is possible to predict the spin-spin relaxation time of the crosslinked foam and the content ratio of each phase from the results of pulsed NMR measurement performed for another polyethylene without the necessity to perform pulsed NMR measurement in advance on the polyethylene to be used.

Further, in the case where the polymer composition contains a plurality of polymers, it is possible to predict the spin-spin relaxation time of the crosslinked foam and the ratio by measuring the spin-spin relaxation time ($T_{2S}$, $T_{2M}$, and $T_{2L}$) and the content ratio ($F_S$, $F_M$, and $F_L$) of each polymer and calculating the weighted average of these polymers corresponding to the compounding ratios in the polymer composition.

The larger the value of [$F_{S20}-F_{S40}$] in the crosslinked foam, the shock absorbing material tends to have more excellent impact resistance even with a reduced thickness. That is, the shock absorbing material according to this embodiment has excellent impact resistance even with a reduced thickness by the crosslinked foam satisfying the following relational expression.

$$F_{S20} - F_{S40} \geq 0.10 \quad (1)$$

Further, in the crosslinked foam of this embodiment, it is preferable that the maximum value of negative acceleration applied to a 10-kg weight when it is allowed to fall freely from a position 50 mm above the crosslinked foam at 23° C. so as to collide with the crosslinked foam be 20 G or less at a thickness of 10 mm. The maximum value (A10) of negative acceleration can be measured as follows. First, a crosslinked foam of 50 mm (length)×50 mm (width)×10 mm (thickness) is placed on a horizontal table (material: iron). Thereafter, the maximum value (A10) of negative acceleration applied to a weight (mass: 10 kg, material: iron, indenter tip shape: circular cylindrical shape with a diameter of 50 mm, and indenter tip surface shape: circular shape with a diameter of 50 mm) when it is allowed to fall freely from a position 50 mm above the crosslinked foam at 23° C. so as to collide with the crosslinked foam is measured. A more specific measurement method is disclosed in "Journal of sports industry, Vol. 9, No. 1 (1999), 1 to 7. Nishiwaki and Nasako" and "Joint symposium 2009, Sports engineering symposium, symposium: Human dynamics (2009) 457-460. Tateishi, Harano, Mori, and Nishiwaki".

In this embodiment, the specific gravity of the crosslinked foam is preferably 0.10 to 0.40. The specific gravity of the crosslinked foam means a value measured by the A method "Underwater displacement" of JIS K7112 under a temperature condition of 23° C.

In this embodiment, in order to allow the shock absorbing material to have excellent softness, the C hardness of the crosslinked foam is preferably 70 or less, more preferably 60 or less, particularly preferably 55 or less. However, if the shoe sole members are formed from a crosslinked foam having excessively low hardness, the wearing feeling of the shoe including the shoe sole members may possibly be deteriorated. Accordingly, the C hardness of the crosslinked foam is preferably 10 or more. The C hardness of the crosslinked foam is a value after 5 seconds from compression in measurement using ASKER Durometer Type C, manufactured by KOBUNSHI KEIKI CO., LTD., at 23° C. More specifically, the C hardness can be determined, for example, by removing the surface portion from the crosslinked foam formed into a specific shape by in-mold foam molding or the like to fabricate a measurement sample having a plate shape with a thickness of 10 mm or more and measuring the measurement sample using the aforementioned durometer.

In this embodiment, it is preferable that the crosslinked foam be a crosslinked foam satisfying the condition of the following formula.

$$E100/E1 \geq 2.0$$

The crosslinked foam obtains high rigidity upon the occurrence of impacts by satisfying the conditions of the aforementioned formula, thereby having an advantage that excessive deformation is suppressed. Here, the aforementioned formula is determined by measuring the complex elastic modulus of the crosslinked foam in dynamic viscoelasticity measurement (temperature: 23° C., distortion: 0.025%, and heating rate: 2° C./min). Further, "E100" in the aforementioned formula represents the complex elastic modulus at a frequency of 100 Hz. Further, "E1" in the aforementioned formula represents the complex elastic modulus at a frequency of 1 Hz. The complex elastic modulus is a value measured according to JIS K7244-4: 1999 "Plastic-Test method for dynamic mechanical properties-Part 4: Tensile vibration-Non-resonance method".

The polymer that is the main component of the polymer composition is not specifically limited in this embodiment, and the same polymers as those used for forming conventional shock absorbing materials (for example, for forming conventional shoe sole members or conventional protective equipment for sports) can be employed.

As the polymer, one or two or more selected from olefin polymers including polyethylene (such as linear low density polyethylene (LLDPE) and high density polyethylene (HDPE)), polypropylene, ethylene-propylene copolymers, propylene-1-hexene copolymers, propylene-4-methyl-1-pentene copolymers, propylene-1-butene copolymers, ethylene-1-hexene copolymers, ethylene-4-methyl-pentene copolymers, ethylene-butene copolymers (EBM), 1-butene-1-hexene copolymers, 1-butene-4-methyl-pentene, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers (EVA), propylene-vinyl acetate copolymers, and copolymers of ethylene with α-olefin (having 3 to 10 carbon atoms), for example, can be employed.

Further, as the polymer, one or two or more selected from polymers other than olefin polymers including urethane polymers such as ester polyurethane and ether polyurethane; and styrene polymers such as styrene-ethylene-butylene copolymers (SEB), styrene-butadiene-styrene copolymers (SBS), hydrogenated products of SBS (styrene-ethylene-butylene-styrene copolymers (SEBS)), styrene-isoprene-styrene copolymers (SIS), hydrogenated products of SIS (styrene-ethylene-propylene-styrene copolymers (SEPS)), styrene-isobutylene-styrene copolymers (SIBS), styrene-butadiene-styrene-butadiene (SBSB), styrene-butadiene-styrene-butadiene-styrene (SBSBS), polystyrene, acrylonitrile styrene resins (AS resins), acrylonitrile butadiene styrene resins (ABS resins), styrene thermoplastic elastomers (TPS) can be employed. Further, other than above, ester thermoplastic elastomers (TPEE), amide thermoplastic elastomers (TPA), or the like can be also employed as the polymer.

Further, examples of polymers that can be employed as the polymer in this embodiment include fluorine-containing polymers such as fluororesin and fluororubber; polyamide polymers including polyamide resins such as polyamide 6, polyamide 11, polyamide 12, polyamide 6,6, and polyamide 610, and polyamide elastomers; polyester resins such as polyethylene terephthalate and polybutylene terephthalate; polyvinyl chloride resins; acrylic resins such as polymethylmethacrylate; silicone elastomers; butadiene rubber (BR); isoprene rubber (IR); chloroprene (CR); natural rubber (NR); styrene butadiene rubber (SBR); acrylonitrile butadiene rubber (NBR); and butyl rubber (IIR).

Further, it is preferable that the polymer composition contain styrene thermoplastic elastomers (TPS). In the case where the polymer contains styrene thermoplastic elastomers (TPS), the content of styrene thermoplastic elastomers (TPS) is preferably 10 to 100 mass %, particularly preferably 20 to 70 mass %.

Further, it is preferable that the polymer composition contain amide thermoplastic elastomers (TPA) for suppressing mold shrinkage. In the case where the polymer contains polyamide thermoplastic elastomers (TPA), the content of amide thermoplastic elastomers (TPA) is preferably 2 to 30 mass %, particularly preferably 4 to 20 mass %.

In the case where the crosslinked foam according to this embodiment containing amide thermoplastic elastomers is a secondary formed body, the mold shrinkage rate is preferably 4.0% or less. The mold shrinkage rate is a mold shrinkage rate described in Examples.

The technique for crosslinking and foaming the polymer is not specifically limited, and crosslinking agents and foaming agents that are used for forming general crosslinked foams can be used also in this embodiment. As the crosslinking agents, organic peroxides, maleimide crosslinking agents, sulfur, phenolic crosslinking agents, oximes, and polyamines, for example, can be employed. Among these, organic peroxides are preferable. Further, it is also possible to form a crosslinked structure using electron beams. In the case of performing electron beam crosslinking, it is also possible to use electron beam crosslinking agents.

As the organic peroxides, one or two or more selected from dicumyl peroxide, di-t-butyl peroxide, 2,5-dimethyl-2,5-di-(t-butylperoxy)hexane, 2,5-dimethyl-2,5-di-(t-butylperoxy)hexyne-3, 1,3-bis(t-butylperoxyisopropyl) benzene, 1,1-bis(t-butylperoxy)-3,3,5-trimethylcyclohexane, n-butyl-4,4-bis(t-butylperoxy) valerate, benzoyl peroxide, p-chlorobenzoyl peroxide, 2,4-dichlorobenzoyl peroxide, t-butylperoxybenzoate, t-butyl perbenzoate, t-butylperoxyisopropyl carbonate, diacetyl peroxide, lauroyl peroxide, and t-butyl cumyl peroxide, for example, can be employed.

The organic peroxides are preferably used for forming the crosslinked foam at a ratio of 0.01 part by mass or more and 10 parts by mass or less with respect to 100 parts by mass of the total of polymers contained in the polymer composition of this embodiment.

Further, crosslinking aids can be used in combination with the crosslinking agents to adjust the crosslink density of the crosslinked foam. As the crosslinking aids, one or two or more selected from divinyl benzene, trimethylolpropane trimethacrylate, 1,6-hexanediol methacrylate, 1,9-nonanediol dimethacrylate, 1,10-decanediol dimethacrylate, trimellitic acid triallyl ester, triallyl isocyanate, neopentyl glycol dimethacrylate, 1,2,4-benzenetricarboxylic acid triallyl ester, tricyclodecane dimethacrylate, and polyethylene glycol diacrylate, for example, can be employed.

Further, the crosslinked foam may be configured by blending inorganic particles having a high surface energy such as clay, talc, silica, and carbon black with the polymer composition, so as to form pseudo crosslinking points in the polymer composition by the inorganic particles.

The technique for foaming the polymer is not specifically limited, and foams can be formed by chemical foaming methods using organic or inorganic chemical foaming agents, or physical foaming methods using physical foaming agents. As the foaming agents, one or two or more selected from thermally decomposable organic foaming agents including: azo compounds such as azodicarbonamide (ADCA), 1,1'-azobis(1-acetoxy-1-phenylethane), dimethyl-2,2'-azobisbutyrate, dimethyl-2,2'-azobisisobutyrate, 2,2'-azobis(2,4,4-trimethylpentane), 1,1'-azobis(cyclohexane-1-carbonitrile), and 2,2'-azobis [N-(2-carboxyethyl)-2-methylpropionamidine]; nitroso compounds such as N,N'-dinitrosopentamethylenetetramine (DPT); hydrazine derivatives such as 4,4'-oxybis(benzenesulfonyl hydrazide) and diphenylsulfone-3,3'-disulfonyl hydrazide; semicarbazide compounds such as p-toluenesulfonyl semicarbazide; and trihydrazino triazine, for example, can be employed.

Further, as the foaming agents, one or two or more selected from thermally decomposable inorganic foaming agents including bicarbonates such as sodium hydrogen carbonate and ammonium hydrogen carbonate, and carbonates such as sodium carbonate and ammonium carbonate; nitrites such as ammonium nitrite, and hydrogen compounds can be employed.

Further, organic foaming agents including various aliphatic hydrocarbons such as methanol, ethanol, propane, butane, pentane, and hexane, and inorganic foaming agents such as air, carbon dioxide, nitrogen, argon, and water also can be used as the foaming agents for forming the crosslinked foam.

Examples of other additives to be contained in the crosslinked foam include dispersants, processing aids, weathering agents, flame retardants, pigments, mold release agents, antistatic agents, antibacterial agents, and deodorizers.

The method for forming such a crosslinked foam is not specifically limited, and conventionally known methods can be employed.

The shoe sole member according to this embodiment has the shock absorbing material according to this embodiment. Further, the shoe according to this embodiment includes the shoe sole member according to this embodiment.

Further, the shock absorbing material according to this embodiment may be used for protective equipment for sports that protects users. In other words, the protective equipment for sports according to this embodiment has the shock absorbing material according to this embodiment. Examples of the protective equipment for sports include exercise mats that are provided on the walls and the floors to protect users, and gloves and protectors that are worn by users for use. Further, the shock absorbing material according to this embodiment may be used not only for exercise mats but also for mats that are used for other applications. Further, the shock absorbing material according to this embodiment may be used as core materials or bases provided inside the walls or the floors for the purpose of buffering the impact during exercise.

The shock absorbing material, the shoe sole member, the shoe, and the protective equipment for sports according to the present invention are not limited to the aforementioned embodiments. Further, the shock absorbing material, the shoe sole member, the shoe, and the protective equipment for sports according to the present invention are not limited to those having the aforementioned operational effects. Various modifications can be made to the shock absorbing material, the shoe sole member, the shoe, and the protective equipment for sports according to the present invention without departing from the gist of the present invention. For example, the shock absorbing material of the present invention may be formed only from the aforementioned crosslinked foam or may be formed using other materials such as fabrics and resin sheets in combination within the range in which the effects of the present invention are not impaired.

Example 1

Next, the present invention will be described further in detail by way of examples. The present invention is not limited to these examples.

(Preliminary Examination 1)

A styrene thermoplastic elastomer having a hard segment and a soft segment (hereinafter, referred to also as "TPS-A"), three types of olefin thermoplastic resins (hereinafter, referred to also as "TPO-A", "TPO-B", and "TPO-C"), and an ethylene-vinyl acetate copolymerized resin (hereinafter, referred to also as "EVA-A") were prepared, and the spin-spin relaxation time ($T_{2S}$, $T_{2M}$, and $T_{2L}$ at 25° C. and the content ratio ($F_S$, $F_M$, and $F_L$) of each phase (S phase, M phase, and L phase) were measured in an uncrosslinked state using pulsed NMR. Further, also for crosslinked foams fabricated using these polymers, the spin-spin relaxation time and the content ratio of each phase were measured by pulsed NMR. Table 1 below shows the results.

TABLE 1

| No. | Polymer type | Measured state | $T_{2L}$[ms] | $T_{2M}$[ms] | $T_{2S}$[ms] | $F_L$ | $F_M$ | $F_S$ |
|---|---|---|---|---|---|---|---|---|
| 1-1 | TPS-A | Uncrosslinked | 0.190 | 0.056 | 0.016 | 0.37 | 0.54 | 0.09 |
| 1-2 | TPS-A | Crosslinked foam | 0.245 | 0.072 | 0.014 | 0.44 | 0.48 | 0.09 |
| 2-1 | TPO-A | Uncrosslinked | 0.225 | 0.055 | 0.012 | 0.29 | 0.52 | 0.20 |
| 2-2 | TPO-A | Crosslinked foam | 0.220 | 0.053 | 0.012 | 0.29 | 0.53 | 0.18 |
| 3-1 | TPO-B | Uncrosslinked | 0.260 | 0.066 | 0.011 | 0.42 | 0.40 | 0.18 |
| 3-2 | TPO-B | Crosslinked foam | 0.261 | 0.065 | 0.011 | 0.44 | 0.40 | 0.16 |
| 4-1 | TPO-C | Uncrosslinked | 0.295 | 0.070 | 0.011 | 0.66 | 0.23 | 0.11 |
| 4-2 | TPO-C | Crosslinked foam | 0.313 | 0.076 | 0.010 | 0.68 | 0.20 | 0.11 |
| 5-1 | EVA-A | Uncrosslinked | 0.258 | 0.049 | 0.012 | 0.25 | 0.52 | 0.24 |
| 5-2 | EVA-A | Crosslinked foam | 0.273 | 0.052 | 0.011 | 0.27 | 0.51 | 0.22 |

(Preliminary Examination 2)

Crosslinked foams were fabricated using mixed resins obtained by blending the styrene thermoplastic elastomer (TPS-A) and the first thermoplastic resin (TPO-A) of Preliminary Examination 1, respectively, at mass ratios ("TPS-A"/"TPO-A") of "80/20", "70/30", and "60/40". The crosslinked foams were measured by pulsed NMR, and the spin-spin relaxation time ($T_{2S}$, $T_{2M}$, and $T_2$) at 25° C. and the ratio ($F_S$, $F_M$, and $F_L$) of each phase (S phase, M phase, and L phase) were determined. Further, in order to predict the results of the pulsed NMR measurement for the crosslinked foams using the mixed resins, the weighted average based on the data of the crosslinked foams (No. 1-2 and No. 2-2) in Table 1 was determined by calculation. That is, the "$T_{2L}$" value of the crosslinked foam of "80/20" was predicted to be "0.240" by calculating formula "(0.245×80+0.220×20)/100", since the "$T_{2L}$" value of "TPS-A" was "0.245" and the "$T_{2L}$" value of "TPO-A" was "0.220" in Table 1. Further, also for other polymers, the weighted average was determined by calculation in the same manner in order to predict the values of the spin-spin relaxation time ($T_{2S}$ and $T_{2M}$) and the ratio ($F_S$, $F_M$, and $F_L$) of each phase. Table 2 below shows the predicted values from the weighted average and the actually measured values for the crosslinked foams.

TABLE 2

| "TPS-A"/"TPO-A" | Measured state | $T_{2L}$[ms] | $T_{2M}$[ms] | $T_{2S}$[ms] | $F_L$ | $F_M$ | $F_S$ |
|---|---|---|---|---|---|---|---|
| 80/20 | Crosslinked foam | 0.238 | 0.065 | 0.014 | 0.455 | 0.445 | 0.100 |
|  | Predicted value | 0.240 | 0.068 | 0.014 | 0.408 | 0.487 | 0.105 |
| 70/30 | Crosslinked foam | 0.230 | 0.061 | 0.012 | 0.385 | 0.507 | 0.108 |
|  | Predicted value | 0.237 | 0.066 | 0.014 | 0.393 | 0.492 | 0.115 |
| 60/40 | Crosslinked foam | 0.232 | 0.061 | 0.013 | 0.406 | 0.475 | 0.119 |
|  | Predicted value | 0.235 | 0.064 | 0.014 | 0.379 | 0.497 | 0.124 |

Further, a crosslinked foam was fabricated using a mixed resin obtained by blending a styrene thermoplastic elastomer (hereinafter, referred to also as "TPS-B") in which the values of the spin-spin relaxation time ($T_{2S}$, $T_{2M}$, and $T_{2L}$) and the ratio ($F_S$, $F_M$, and $F_L$) of each phase in an uncrosslinked state were as shown in Table 3 below with the aforementioned olefin thermoplastic resin (TPO-A) at a mass ratio ("TPS-B"/"TPO-A") of "80/20". The crosslinked foam was measured by pulsed NMR, and the spin-spin relaxation time ($T_{2S}$, $T_{2M}$, and $T_{2L}$) at 25° C. and the ratio ($F_S$, $F_M$, and $F_L$) of each phase were determined. Further, in order to predict the results of the pulsed NMR measurement for the crosslinked foam, the weighted average based on the data (No. 2-1) of the olefin thermoplastic resin (TPO-A) in an uncrosslinked state in Table 1 and the data (No. 6-1) of the styrene thermoplastic elastomer (TPS-B) in an uncrosslinked state shown in Table 3 below was determined by calculation. Table 3 shows the predicted values together with the measured values for the crosslinked foam.

TABLE 3

| No. | Polymer type | Measured state | $T_{2L}$[ms] | $T_{2M}$[ms] | $T_{2S}$[ms] | $F_L$ | $F_M$ | $F_S$ |
|---|---|---|---|---|---|---|---|---|
| 6-1 | TPS-B | Uncrosslinked | 0.177 | 0.06 | 0.017 | 0.42 | 0.52 | 0.06 |
|  | "TPS-B"/"TPO-A" = 80/20 | Crosslinked foam | 0.196 | 0.060 | 0.013 | 0.382 | 0.527 | 0.091 |
|  |  | Predicted value | 0.187 | 0.059 | 0.016 | 0.394 | 0.520 | 0.088 |

Also from the results shown in Tables above, it is understood that, when a crosslinked foam is created using a polymer or the like, predicting the values of the spin-spin relaxation time and the content ratio of each phase of the crosslinked foam is facilitated by measuring the spin-spin relaxation time and the ratio of each phase of the polymer before crosslinking by pulsed NMR. That is, from the results shown in Tables above, it is understood that whether or not the crosslinked foam satisfies the following inequality is easily predicted.

$$F_{S20} - F_{S40} \geq 0.10 \quad (1)$$

EXAMPLES, COMPARATIVE EXAMPLES, AND REFERENCE EXAMPLES

As the polymer, styrene thermoplastic elastomers (TPS1, TPS2, TPS3, and TPS4), olefin resins (PE1, PE2, PE3, and PE4), and an amide thermoplastic elastomer (TPA) were prepared. Further, as other components, stearic acid, zinc oxide, a chemical foaming agent, a crosslinking agent, and a crosslinking aid were prepared. Then, 100 parts by mass of the polymer blended as shown in Tables 5 to 7, 1 part by mass of stearic acid, 0.5 part by mass of the crosslinking agent, 0.15 part by mass of the crosslinking aid, the zinc oxide, and the chemical foaming agent were kneaded to obtain a kneaded mixture, and the kneaded mixture was heated at 165° C. for 15 minutes to obtain a primary foam. Next, the primary foam was cut out into 250 mm (length) (A)×250 mm (width) (B)×12 mm (height), and the cut-out primary foam was compressed at 23° C. to a height of 8 mm. Then, it was heated at 160° C. for 5 minutes while being compressed, followed by cooling and press molding until the time at which it is cooled to normal temperature (23° C.) while the compressed state was maintained, to obtain a secondary foam. Thus, the secondary foam was served as the crosslinked foam in each of Examples and Comparative Examples. Further, after being obtained, the secondary foam was allowed to stand still at room temperature for two weeks, and thereafter the vertical length (A') and the horizontal length (B') of the secondary foam were measured. Then, the mold shrinkage rate (S) was calculated by the following formula.

$$S=((A-A')\times 100/A+(B-B')\times 100/B)/2$$

The specific gravity of the crosslinked foam to be obtained was varied by changing the compounding ratios of the chemical foaming agent and the zinc oxide. Specifically in Examples and Comparative Examples, the chemical foaming agent was adjusted within the range of 0.5 to 10 parts by mass, and the zinc oxide was adjusted within the range of 0.25 to 5 parts by mass, with respect to 100 parts by mass of the polymer. Further, polymers of Reference Examples blended as shown in Table 4 below were fabricated. In Comparative Example 1, no crosslinked foam was obtained.

Figure 2:
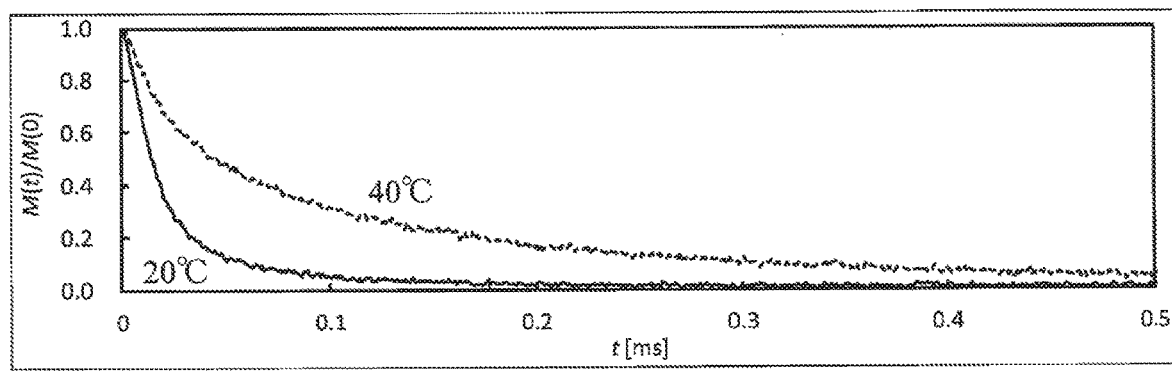
FIG. 2 is a graph showing the results of pulsed NMR measurement for a crosslinked foam of Example 11.
Figure 3:
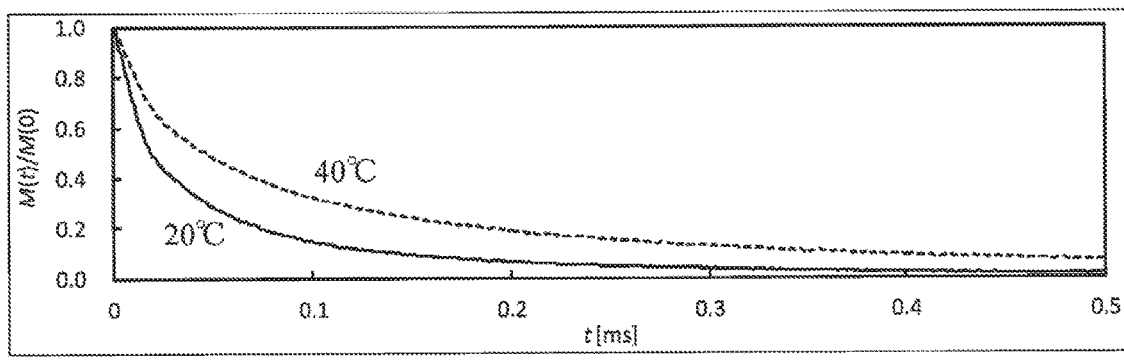
FIG. 3 is a graph showing the results of pulsed NMR measurement for a crosslinked foam of Comparative Example 3.

The maximum acceleration in a drop-weight test, the specific gravity the complex elastic modulus, the hardness, and the mold shrinkage rate were measured for the crosslinked foams of Examples and Comparative Examples. Further, the specific gravity, the complex elastic modulus, and the hardness were measured for the polymers of Reference Examples. Tables 4 to 7 show these results. Further, the crosslinked foams of Examples and Comparative Examples, and the polymers of Reference Examples were measured by pulsed NMR. Tables 4 to 7 show these results. FIG. 2 shows the results of pulsed NMR measurement for the crosslinked foam of Example 11. Further. FIG. 3 shows the results of pulsed NMR measurement for the crosslinked foam of Comparative Example 3. The letter "A", "C", or "D" is attached before the numerical values of the hardness, where the letter "A" attached before the numerical values indicates the A hardness, the letter "C" attached before the numerical values indicates the C hardness, and the letter "D" attached before the numerical values indicates the D hardness. The A hardness is an instantaneous value obtained by conducting a spring hardness test of type A according to JIS K7312 at 23° C. Further, the D hardness is an instantaneous value obtained by conducting a spring hardness test of type D according to JIS K7312 at 23° C.

TABLE 4

|  | Polymer | Hardness | Reference Examples |  |  |  |  |  |  |  |  |  |  |
|---|---|---|---|---|---|---|---|---|---|---|---|---|---|
|  |  |  | 1 | 2 | 3 | 4 | 5 | 6 | 7 | 8 | 9 | 10 | 11 |
| Polymer blending (parts by mass) | TPS1 | A87 | 100 |  |  |  |  |  |  |  |  | 60 | 30 |
|  | TPS2 | A71 |  | 100 |  |  |  |  |  |  |  | 40 | 70 |
|  | TPS3 | D72 |  |  | 100 |  |  |  |  |  |  |  |  |
|  | TPS4 | A84 |  |  |  | 100 |  |  |  |  |  |  |  |
|  | EVA1 | A92 |  |  |  |  | 100 |  |  |  |  |  |  |
|  | PE1 | A96 |  |  |  |  |  | 100 |  |  |  |  |  |
|  | PE2 | A87 |  |  |  |  |  |  | 100 |  |  |  |  |
|  | PE3 | A64 |  |  |  |  |  |  |  | 100 |  |  |  |
|  | PE4 | D54 |  |  |  |  |  |  |  |  | 100 |  |  |
|  | TPA1 | D81 |  |  |  |  |  |  |  |  |  |  |  |
|  | TPA2 | D40 |  |  |  |  |  |  |  |  |  |  |  |
| Shock absorbing properties | A10 | [G] | — | — | — | — | — | — | — | — | — | — | — |
| Specific gravity | SG | [—] | 1.00 | 0.98 | 0.97 | 0.91 | 0.93 | 0.92 | 0.88 | 0.88 | 0.91 | 1.00 | 0.99 |
| Complex elastic modulus 1 Hz | E1 | [MPa] | 26 | 11 | 902 | 35 | 50 | 93 | 32 | 6 | 147 | 20 | 16 |
| Complex elastic modulus 100 Hz | E100 | [MPa] | 270 | 45 | 957 | 40 | 75 | 132 | 38 | 8 | 230 | 180 | 112 |
| Frequency dependence of complex elastic modulus | E100/E1 | [—] | 10.5 | 4.0 | 1.1 | 1.1 | 1.5 | 1.4 | 1.2 | 1.3 | 1.6 | 9.1 | 7.2 |
| Hardness | | [°] | A87 | A71 | D72 | A84 | A92 | A96 | A87 | A64 | D54 | A80 | A74 |
| Mold shrinkage rate | | [%] | — | — | — | — | — | — | — | — | — | — | — |
| Pulsed NMR [20° C.] | T2L20 | [ms] | 0.267 | 0.203 | 0.468 | 0.528 | 0.197 | 0.213 | 0.220 | 0.483 | 0.139 | 0.330 | 0.300 |
|  | T2M20 | [ms] | 0.033 | 0.047 | 0.085 | 0.202 | 0.040 | 0.036 | 0.053 | 0.115 | 0.033 | 0.040 | 0.050 |
|  | T2S20 | [ms] | 0.014 | 0.015 | 0.014 | 0.014 | 0.011 | 0.010 | 0.012 | 0.007 | 0.009 | 0.015 | 0.014 |
|  | FL20 | [—] | 0.01 | 0.21 | 0.42 | 0.51 | 0.17 | 0.11 | 0.29 | 0.68 | 0.11 | 0.03 | 0.09 |
|  | FM20 | [—] | 0.25 | 0.41 | 0.05 | 0.29 | 0.53 | 0.55 | 0.53 | 0.18 | 0.50 | 0.37 | 0.40 |
|  | FS20 | [—] | 0.74 | 0.38 | 0.53 | 0.20 | 0.30 | 0.34 | 0.18 | 0.14 | 0.39 | 0.60 | 0.51 |
| Pulsed NMR [40° C.] | T2L40 | [ms] | 0.187 | 0.365 | 0.560 | 0.620 | 0.335 | 0.181 | 0.300 | 0.630 | 0.199 | 0.265 | 0.290 |
|  | T2M40 | [ms] | 0.054 | 0.076 | 0.080 | 0.090 | 0.063 | 0.047 | 0.060 | 0.147 | 0.049 | 0.069 | 0.064 |
|  | T2S40 | [ms] | 0.016 | 0.015 | 0.014 | 0.014 | 0.014 | 0.011 | 0.014 | 0.009 | 0.009 | 0.017 | 0.016 |
|  | FL40 | [—] | 0.32 | 0.57 | 0.50 | 0.83 | 0.31 | 0.21 | 0.42 | 0.85 | 0.19 | 0.3 | 0.43 |

TABLE 4-continued

|  |  | Reference Examples | | | | | | | | | | |
| --- | --- | --- | --- | --- | --- | --- | --- | --- | --- | --- | --- | --- |
| Polymer | Hardness | 1 | 2 | 3 | 4 | 5 | 6 | 7 | 8 | 9 | 10 | 11 |
| FM40 | [—] | 0.46 | 0.23 | 0.01 | 0.01 | 0.48 | 0.54 | 0.46 | 0.05 | 0.45 | 0.43 | 0.37 |
| FS40 | [—] | 0.22 | 0.20 | 0.49 | 0.16 | 0.21 | 0.25 | 0.12 | 0.10 | 0.36 | 0.27 | 0.20 |

TABLE 5

|  |  |  | Examples | | | | | | | | | |
| --- | --- | --- | --- | --- | --- | --- | --- | --- | --- | --- | --- |
|  |  |  | 1 | 2 | 3 | 4 | 5 | 6 | 7 | 8 | 9 | 10 |
| Polymer blending (parts by mass) | A87 | TPS1 | 100 | 100 | 100 | 100 | 100 |  |  |  |  |  |
|  | A71 | TPS2 |  |  |  |  |  | 100 | 100 | 100 | 100 | 100 |
|  | D72 | TPS3 |  |  |  |  |  |  |  |  |  |  |
|  | A84 | TPS4 |  |  |  |  |  |  |  |  |  |  |
|  | A92 | EVA1 |  |  |  |  |  |  |  |  |  |  |
|  | A96 | PE1 |  |  |  |  |  |  |  |  |  |  |
|  | A87 | PE2 |  |  |  |  |  |  |  |  |  |  |
|  | A64 | PE3 |  |  |  |  |  |  |  |  |  |  |
|  | D54 | PE4 |  |  |  |  |  |  |  |  |  |  |
|  | D81 | TPA1 |  |  |  |  |  |  |  |  |  |  |
|  | D40 | TPA2 |  |  |  |  |  |  |  |  |  |  |
| Shock absorbing properties | A10 | [G] | 50.0 | 20.0 | 13.6 | 16.7 | 18.0 | 18.0 | 19.5 | 22.0 | 25.1 | 25.1 |
| Specific gravity | SG | [—] | 0.40 | 0.30 | 0.20 | 0.15 | 0.10 | 0.41 | 0.30 | 0.20 | 0.18 | 0.10 |
| Complex elastic modulus 1 Hz | E1 | [MPa] | 7.0 | 4.9 | 2.9 | 1.8 | 1.0 | 3.3 | 2.2 | 1.3 | 1.2 | 0.7 |
| Complex elastic modulus 100 Hz | E100 | [MPa] | 78.0 | 50.0 | 27.7 | 16.2 | 7.0 | 12.5 | 8.0 | 4.8 | 4.5 | 2.5 |
| Frequency dependence of complex elastic modulus | E100/E1 | [—] | 11.2 | 10.2 | 9.5 | 8.8 | 7.0 | 3.8 | 3.6 | 3.7 | 3.6 | 3.6 |
| Hardness |  | [°] | C57 | C50 | C42 | C36 | C28 | C53 | C44 | C36 | C35 | C30 |
| Mold shrinkage rate |  | [%] | 5.0 | 5.0 | 5.0 | 5.0 | 5.0 | 5.0 | 5.0 | 5.0 | 5.0 | 5.0 |
| Pulsed NMR [20° C.] | T2L20 | [ms] | 0.352 | 0.424 | 0.420 | 0.422 | 0.419 | 0.190 | 0.202 | 0.200 | 0.206 | 0.202 |
|  | T2M20 | [ms] | 0.027 | 0.032 | 0.030 | 0.029 | 0.033 | 0.045 | 0.049 | 0.051 | 0.042 | 0.044 |
|  | T2S20 | [ms] | 0.014 | 0.014 | 0.015 | 0.015 | 0.016 | 0.015 | 0.016 | 0.016 | 0.016 | 0.016 |
|  | FL20 | [—] | 0.02 | 0.03 | 0.03 | 0.02 | 0.03 | 0.16 | 0.15 | 0.16 | 0.15 | 0.14 |
|  | FM20 | [—] | 0.27 | 0.24 | 0.25 | 0.25 | 0.26 | 0.45 | 0.44 | 0.44 | 0.43 | 0.44 |
|  | FS20 | [—] | 0.71 | 0.73 | 0.72 | 0.73 | 0.71 | 0.39 | 0.41 | 0.40 | 0.42 | 0.42 |
| Pulsed NMR [40° C.] | T2L40 | [ms] | 0.190 | 0.205 | 0.201 | 0.182 | 0.194 | 0.365 | 0.360 | 0.361 | 0.366 | 0.365 |
|  | T2M40 | [ms] | 0.050 | 0.052 | 0.059 | 0.052 | 0.054 | 0.076 | 0.074 | 0.078 | 0.076 | 0.076 |
|  | T2S40 | [ms] | 0.016 | 0.016 | 0.014 | 0.015 | 0.016 | 0.015 | 0.015 | 0.014 | 0.016 | 0.015 |
|  | FL40 | [—] | 0.19 | 0.20 | 0.20 | 0.19 | 0.21 | 0.57 | 0.57 | 0.56 | 0.57 | 0.57 |
|  | FM40 | [—] | 0.53 | 0.54 | 0.55 | 0.53 | 0.52 | 0.23 | 0.23 | 0.24 | 0.23 | 0.22 |
|  | FS40 | [—] | 0.28 | 0.26 | 0.25 | 0.28 | 0.27 | 0.20 | 0.20 | 0.20 | 0.20 | 0.21 |
|  | FS20 − FS40 |  | 0.43 | 0.47 | 0.47 | 0.45 | 0.44 | 0.19 | 0.21 | 0.20 | 0.22 | 0.21 |

|  |  |  | Examples | | | | | | |
| --- | --- | --- | --- | --- | --- | --- | --- | --- | --- |
|  |  |  | 11 | 12 | 13 | 14 | 15 | 16 | 17 |
| Polymer blending (parts by mass) | A87 | TPS1 | 60 | 60 | 60 | 60 | 30 | 30 | 30 |
|  | A71 | TPS2 | 40 | 40 | 40 | 40 | 70 | 70 | 70 |
|  | D72 | TPS3 |  |  |  |  |  |  |  |
|  | A84 | TPS4 |  |  |  |  |  |  |  |
|  | A92 | EVA1 |  |  |  |  |  |  |  |
|  | A96 | PE1 |  |  |  |  |  |  |  |
|  | A87 | PE2 |  |  |  |  |  |  |  |
|  | A64 | PE3 |  |  |  |  |  |  |  |
|  | D54 | PE4 |  |  |  |  |  |  |  |
|  | D81 | TPA1 |  |  |  |  |  |  |  |
|  | D40 | TPA2 |  |  |  |  |  |  |  |

TABLE 5-continued

| | | | | | | | | | |
|---|---|---|---|---|---|---|---|---|---|
| Shock absorbing properties | A10 | [G] | 19.0 | 16.5 | 14.5 | 21.0 | 16.3 | 19.4 | 21.0 |
| Specific gravity | SG | [—] | 0.24 | 0.20 | 0.15 | 0.10 | 0.23 | 0.15 | 0.10 |
| Complex elastic modulus 1 Hz | E1 | [MPa] | 2.9 | 2.5 | 1.9 | 0.9 | 2.1 | 1.6 | 1.2 |
| Complex elastic modulus 100 Hz | E100 | [MPa] | 17.7 | 15.8 | 12.0 | 5.6 | 11.6 | 7.8 | 5.5 |
| Frequency dependence of complex elastic modulus | E100/E1 | [—] | 6.1 | 6.3 | 6.3 | 6.2 | 5.6 | 5.0 | 4.6 |
| Hardness | | [°] | C45 | C43 | C38 | C27 | C40 | C36 | C30 |
| Mold shrinkage rate | | [%] | 5.0 | 5.0 | 5.0 | 5.0 | 5.0 | 5.0 | 5.0 |
| Pulsed NMR [20° C.] | T2L20 | [ms] | 0.289 | 0.320 | 0.316 | 0.314 | 0.203 | 0.307 | 0.300 |
| | T2M20 | [ms] | 0.037 | 0.040 | 0.039 | 0.037 | 0.039 | 0.047 | 0.045 |
| | T2S20 | [ms] | 0.014 | 0.015 | 0.015 | 0.015 | 0.015 | 0.016 | 0.016 |
| | FL20 | [—] | 0.03 | 0.05 | 0.05 | 0.06 | 0.08 | 0.07 | 0.06 |
| | FM20 | [—] | 0.38 | 0.34 | 0.35 | 0.33 | 0.43 | 0.42 | 0.42 |
| | FS20 | [—] | 0.59 | 0.61 | 0.60 | 0.61 | 0.49 | 0.51 | 0.52 |
| Pulsed NMR [40° C.] | T2L40 | [ms] | 0.265 | 0.260 | 0.270 | 0.263 | 0.290 | 0.285 | 0.275 |
| | T2M40 | [ms] | 0.069 | 0.070 | 0.071 | 0.075 | 0.064 | 0.069 | 0.072 |
| | T2S40 | [ms] | 0.017 | 0.017 | 0.017 | 0.017 | 0.016 | 0.016 | 0.016 |
| | FL40 | [—] | 0.30 | 0.30 | 0.32 | 0.29 | 0.43 | 0.40 | 0.43 |
| | FM40 | [—] | 0.43 | 0.43 | 0.42 | 0.44 | 0.37 | 0.38 | 0.36 |
| | FS40 | [—] | 0.27 | 0.27 | 0.26 | 0.27 | 0.20 | 0.22 | 0.21 |
| | FS20 − FS40 | | 0.32 | 0.34 | 0.34 | 0.34 | 0.29 | 0.29 | 0.31 |

TABLE 6

| | | | Examples | | | | | | | | | | | |
|---|---|---|---|---|---|---|---|---|---|---|---|---|---|---|
| | | | 18 | 19 | 20 | 21 | 22 | 23 | 24 | 25 | 26 | 27 | 28 | 29 |
| Polymer blending (parts by mass) | A87 | TPS1 | 70 | 50 | 30 | 30 | 10 | | 60 | 60 | 60 | 60 | 60 | 60 |
| | A71 | TPS2 | | | | 20 | 20 | 50 | | | | | | |
| | D72 | TPS3 | | | | | | | | | | | | |
| | A84 | TPS4 | | | | | | | | | | | | |
| | A92 | EVA1 | | | | | | | | | | | | |
| | A96 | PE1 | | | | | | | | | | | | |
| | A87 | PE2 | | | | | | | 36 | 32 | 24 | 36 | 32 | 24 |
| | A64 | PE3 | 30 | 50 | 70 | 50 | 70 | 50 | | | | | | |
| | D54 | PE4 | | | | | | | | | | | | |
| | D81 | TPA1 | | | | | | | 4 | 8 | 16 | | | |
| | D40 | TPA2 | | | | | | | | | | 4 | 8 | 16 |
| Shock absorbing properties | A10 | [G] | 13.1 | 14.5 | 21.5 | 17.7 | 20.8 | 18.6 | 15.6 | 14.8 | 16.1 | 14.8 | 15.9 | 17.4 |
| Specific gravity | SG | [—] | 0.20 | 0.22 | 0.21 | 0.21 | 0.24 | 0.23 | 0.14 | 0.14 | 0.14 | 0.13 | 0.13 | 0.13 |
| Complex elastic modulus 1 Hz | E1 | [MPa] | 1.6 | 1.6 | 1.4 | 1.4 | 1.3 | 1.3 | 2.3 | 2.4 | 3.7 | 2.1 | 1.8 | 2.8 |
| Complex elastic modulus 100 Hz | E100 | [MPa] | 9.1 | 10.1 | 4.1 | 5.7 | 3.1 | 3.4 | 11.5 | 11.7 | 17.9 | 11.0 | 8.7 | 12.3 |
| Frequency dependence of complex elastic modulus | E100/E1 | [—] | 5.9 | 6.2 | 3.0 | 4.1 | 2.3 | 2.7 | 5.0 | 5.0 | 4.8 | 5.2 | 4.9 | 4.3 |
| Hardness | | [°] | C38 | C43 | C40 | C41 | C43 | C41 | C46 | C46 | C44 | C45 | C42 | C38 |
| Mold shrinkage rate | | [%] | 4.5 | 4.5 | 4.5 | 4.5 | 4.5 | 4.5 | 3.0 | 3.0 | 2.2 | 3.0 | 2.6 | 2.4 |

TABLE 6-continued

| | | | Examples | | | | | | | | | | | |
|---|---|---|---|---|---|---|---|---|---|---|---|---|---|---|
| | | | 18 | 19 | 20 | 21 | 22 | 23 | 24 | 25 | 26 | 27 | 28 | 29 |
| Pulsed NMR [20° C.] | T2L20 | [ms] | 0.437 | 0.449 | 0.434 | 0.435 | 0.422 | 0.427 | 0.230 | 0.253 | 0.241 | 0.264 | 0.283 | 0.299 |
| | T2M20 | [ms] | 0.074 | 0.086 | 0.089 | 0.082 | 0.078 | 0.070 | 0.043 | 0.047 | 0.044 | 0.050 | 0.060 | 0.057 |
| | T2S20 | [ms] | 0.013 | 0.012 | 0.011 | 0.013 | 0.011 | 0.013 | 0.013 | 0.013 | 0.013 | 0.013 | 0.013 | 0.013 |
| | FL20 | [—] | 0.28 | 0.42 | 0.53 | 0.42 | 0.55 | 0.45 | 0.18 | 0.14 | 0.10 | 0.18 | 0.18 | 0.18 |
| | FM20 | [—] | 0.15 | 0.17 | 0.20 | 0.18 | 0.21 | 0.22 | 0.37 | 0.33 | 0.29 | 0.36 | 0.29 | 0.29 |
| | FS20 | [—] | 0.57 | 0.41 | 0.27 | 0.40 | 0.24 | 0.33 | 0.45 | 0.53 | 0.61 | 0.46 | 0.53 | 0.53 |
| Pulsed NMR [40° C.] | T2L40 | [ms] | 0.539 | 0.587 | 0.590 | 0.576 | 0.571 | 0.531 | 0.386 | 0.356 | 0.305 | 0.335 | 0.331 | 0.356 |
| | T2M40 | [ms] | 0.053 | 0.068 | 0.073 | 0.076 | 0.077 | 0.082 | 0.079 | 0.071 | 0.060 | 0.066 | 0.059 | 0.063 |
| | T2S40 | [ms] | 0.015 | 0.015 | 0.013 | 0.014 | 0.012 | 0.013 | 0.016 | 0.014 | 0.013 | 0.015 | 0.014 | 0.015 |
| | FL40 | [—] | 0.38 | 0.53 | 0.67 | 0.55 | 0.70 | 0.62 | 0.25 | 0.25 | 0.22 | 0.34 | 0.36 | 0.33 |
| | FM40 | [—] | 0.34 | 0.22 | 0.16 | 0.24 | 0.17 | 0.21 | 0.44 | 0.44 | 0.41 | 0.42 | 0.44 | 0.43 |
| | FS40 | [—] | 0.28 | 0.25 | 0.17 | 0.21 | 0.13 | 0.17 | 0.31 | 0.31 | 0.37 | 0.24 | 0.20 | 0.24 |
| | FS20 − FS40 | | 0.29 | 0.16 | 0.10 | 0.19 | 0.11 | 0.16 | 0.14 | 0.22 | 0.24 | 0.22 | 0.33 | 0.29 |

TABLE 7

| | | | Comparative Examples | | | | | | | | | |
|---|---|---|---|---|---|---|---|---|---|---|---|---|
| | | | 1 | 2 | 3 | 4 | 5 | 6 | 7 | 8 | 9 | 10 |
| Polymer blending (parts by mass) | A87 | TPS1 | | | | | | | | | | |
| | A71 | TPS2 | | | | | | | | | | |
| | D72 | TPS3 | 100 | | | | | | | | | |
| | A84 | TPS4 | | 100 | | | | | | | | |
| | A92 | EVA1 | | | 100 | 100 | 100 | | | | | |
| | A96 | PE1 | | | | | | 100 | 100 | 100 | | |
| | A87 | PE2 | | | | | | | | | | |
| | A64 | PE3 | | | | | | | | | 100 | 100 |
| | D54 | PE4 | | | | | | | | | | |
| | D81 | TPA1 | | | | | | | | | | |
| | D40 | TPA2 | | | | | | | | | | |
| Shock absorbing properties | A10 | [G] | | 36.0 | 20.0 | 23.0 | 27.2 | 19.0 | 25.0 | 30.0 | 34.5 | 43.5 |
| Specific gravity | SG | [—] | | 0.17 | 0.33 | 0.18 | 0.15 | 0.15 | 0.11 | 0.08 | 0.23 | 0.13 |
| Complex elastic modulus 1 Hz | E1 | [MPa] | | 2.1 | 8.0 | 4.0 | 2.9 | 9.2 | 4.0 | 3.5 | 1.2 | 1.0 |
| Complex elastic modulus 100 Hz | E100 | [MPa] | | 2.6 | 11.9 | 5.9 | 4.3 | 13.7 | 5.9 | 5.1 | 1.7 | 1.2 |
| Frequency dependence of complex elastic modulus | E100/E1 | [—] | | 1.2 | 1.49 | 1.48 | 1.48 | 1.49 | 1.48 | 1.46 | 1.34 | 1.25 |
| Hardness | | [°] | | C45 | C74 | C55 | C49 | C73 | C55 | C45 | C43 | C29 |
| Mold shrinkage rate | | [%] | | 5.0 | 1.5 | 1.5 | 1.5 | 2.0 | 2.0 | 2.0 | 2.0 | 2.0 |
| Pulsed NMR [20° C.] | T2L20 | [ms] | | 0.560 | 0.220 | 0.215 | 0.212 | 0.213 | 0.210 | 0.219 | 0.463 | 0.460 |
| | T2M20 | [ms] | | 0.202 | 0.049 | 0.051 | 0.055 | 0.036 | 0.040 | 0.039 | 0.110 | 0.119 |
| | T2S20 | [ms] | | 0.014 | 0.011 | 0.012 | 0.012 | 0.010 | 0.010 | 0.010 | 0.008 | 0.008 |
| | FL20 | [—] | | 0.53 | 0.22 | 0.23 | 0.21 | 0.11 | 0.10 | 0.12 | 0.64 | 0.64 |
| | FM20 | [—] | | 0.28 | 0.55 | 0.55 | 0.58 | 0.55 | 0.55 | 0.54 | 0.25 | 0.24 |
| | FS20 | [—] | | 0.19 | 0.23 | 0.22 | 0.21 | 0.34 | 0.35 | 0.34 | 0.11 | 0.12 |
| Pulsed NMR [40° C.] | T2L40 | [ms] | | 0.620 | 0.335 | 0.335 | 0.340 | 0.181 | 0.183 | 0.186 | 0.630 | 0.640 |
| | T2M40 | [ms] | | 0.090 | 0.063 | 0.063 | 0.060 | 0.047 | 0.045 | 0.050 | 0.147 | 0.140 |
| | T2S40 | [ms] | | 0.014 | 0.014 | 0.014 | 0.014 | 0.011 | 0.011 | 0.011 | 0.009 | 0.009 |
| | FL40 | [—] | | 0.83 | 0.32 | 0.31 | 0.34 | 0.21 | 0.19 | 0.20 | 0.81 | 0.81 |
| | FM40 | [—] | | 0.01 | 0.48 | 0.50 | 0.48 | 0.54 | 0.54 | 0.55 | 0.10 | 0.11 |
| | FS40 | [—] | | 0.16 | 0.20 | 0.19 | 0.18 | 0.25 | 0.27 | 0.25 | 0.09 | 0.08 |
| | FS20 − FS40 | | | 0.03 | 0.03 | 0.03 | 0.03 | 0.09 | 0.08 | 0.09 | 0.02 | 0.04 |

As shown in Tables 5 to 7, the crosslinked foams of Examples had small values of A10 as compared with the crosslinked foams of Comparative Examples having almost the same specific gravity and hardness.

REFERENCE SIGNS LIST

1: Shoe
2: Upper material
3: Midsole
4: Outer sole

The invention claimed is:

1. A shock absorbing material partially or fully formed from a crosslinked foam formed by crosslinking and foaming a polymer composition, wherein
the crosslinked foam has a value obtained by subtracting the content ratio of S phase determined by pulsed NMR measurement at 40° C. from the content ratio of S phase determined by pulsed NMR measurement at 20° C. being 0.10 or more.

2. The shock absorbing material according to claim 1, wherein
the crosslinked foam has a value obtained by subtracting the content ratio of S phase determined by pulsed NMR measurement at 40° C. from the content ratio of S phase determined by pulsed NMR measurement at 20° C. being higher than 0.15.

3. The shock absorbing material according to claim 1, wherein
the polymer composition contains a styrene thermoplastic elastomer.

4. The shock absorbing material according to claim 1, wherein the polymer composition contains an amide thermoplastic elastomer.

5. The shock absorbing material according to claim 1, wherein the maximum value of negative acceleration applied to a 10-kg weight when it is allowed to fall freely from a position 50 mm above the crosslinked foam at 23° C. so as to collide with the crosslinked foam is 20 G or less at a thickness of 10 mm.

6. The shock absorbing material according to claim 1, wherein
the specific gravity of the crosslinked foam is 0.40 or less, and
the C hardness of the crosslinked foam is 60 or less.

7. A shoe sole member comprising:
the shock absorbing material according to claim 1.

8. A shoe comprising:
the shoe sole member according to claim 7.

9. Protective equipment for sports comprising:
the shock absorbing material according to claim 1.

* * * * *